United States Patent Office 2,704,763
Patented Mar. 22, 1955

2,704,763

5-BENZYLOXY-3-CARBALKOXY-INDOLES AND THE PREPARATION THEREOF

John H. Koehneke, Kalamazoo, and Merrill E. Speeter, Kalamazoo Township, Kalamazoo County, Mich., assignors to The Upjohn Company, Kalamazoo, Mich., a corporation of Michigan No Drawing. Application June 6, 1952,
Serial No. 292,188

7 Claims. (Cl. 260—319)

The present invention relates to novel organic compounds, and is more particularly concerned with a novel method for the preparation of 5-benzyloxy-3-carbalkoxyindoles and with the products thus-produced.

The compounds of the present invention may be represented by the formula:

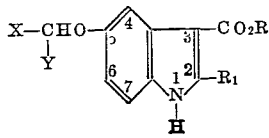

wherein X represents phenyl, halophenyl, lower alkoxyphenyl, and lower alkylphenyl, Y represents hydrogen, phenyl, halophenyl, lower alkoxyplenyl, and lower alkylphenyl, R represents lower alkyl, and $R_1$ represents lower alkyl, phenyl, halophenyl, lower alkoxyphenyl, and lower alkylphenyl.

It is an object of the present invention to prepare the novel 5-benzyloxy-3-carbalkoxyindoles. It is a further object of the present invention to provide a novel process for the preparation of the novel 5-benzyloxy-3-carbalkoxyindoles. Other objects of the invention will be apparent to those skilled in the art to which the invention pertains.

The compounds of the present invention are important intermediates in the preparation of serotonin analogs. Serotonin, 5-hydroxy-3-(2-aminoethyl)-indole, isolated by Rapport, [J. Biol. Chem. 180, 961 (1949)], has been shown to possess powerful vasoconstrictor qualities, and the analogs thereof, such as the 2-methyl-5-hydroxy-3-[2-(N-methylamino-ethyl]-indole, 2 - phenyl-5-hydroxy-3-[2-(N,N-dimethylamino)-ethyl]-indole and the like, prepared from the compounds of the present invention, have also demonstrated marked vasoconstrictor qualities. In the preparation of the serotonin analogs the compounds of the present invention, the 5-benzylloxy-3-carbalkoxyindoles, are hydroylzed by reaction with an alkali-metal hydroxide or carbonate, e. g., potassium hydroxide, the mixture thereafter refluxed and extracted with an organic solvent, such as ether, chloroform, or benzene, for example. The solvent extracts are dried and concentrated to yield the desired 5-benzyloxyindole, e. g., 2-methyl-5-benzyloxyindole. The residue remaining after the solvent extraction containing the alkali-metal salts may be acidified with a mineral acid, e. g., hydrochloric acid, to yield a 5-benzyloxy-3-carboxyindole which on mild heating decomposes to produce additional 5-benzyloxyindole. In some instances the mixture which results from the hydrolysis reaction can be immediately acidified and heated, and the mixture can thereupon be extracted, dried, and concentrated, as previously discussed to produce the desired 5-benzyloxyindole. The thus-produced 5-benzyloxyindole are thereafter reacted with a haloalkanoylamide, e. g., an α-halo-acetamide, such as α-chloro-N-benzylacetamide, in a Grignard reaction, to produce a (5-benzyloxy-3-indole)-alkanoylamide, e. g., α-3-(5-benzyloxy-2-methylinodole)-N-benzylacetamide, as more fully disclosed in the copending application of Merrill E. Speeter, Serial Number 279,931, filed April 4, 1952. The (5-benzyloxy-3-indole)-alkanoylamides are reduced with a suitable reducing agent, e. g., lithium aluminum hydride, to produce a (5-benzyloxy-3-indole)-alkylamine, e. g., 2-methyl-5-benzyloxy-3-[2-(N-benzylamino)-ethyl]-indole, and salts thereof, as more fully disclosed in the copending application of Merrill E. Speeter, Serial Number 282,273, filed April 14, 1952. The (5-benzyloxy-3-indole)-alkylamines are subjected to hydrogenolysis in the presence of a catalyst to produce the serotonin analogs, (5-hydroxy-3-indole)-alkylamines, and salts thereof, as more fully disclosed in the copending application of Merrill E. Speeter, Serial Number 289,872, filed May 24, 1952.

According to the method of the present invention, the 5-benzyloxy-3-carbalkoxyindoles are prepared by reacting a 5-hydroxy-3-carbalkoxyindole with a benzylating agent to introduce the benzyl radical into the five position of the indole ring.

The starting compounds for the method of the present invention are the 5-hydroxy-3-carbalkoxyindoles represented by the following formula:

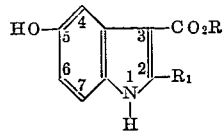

wherein R and $R_1$ have the values specified above. These compounds may be prepared by the condensation of quinone with an alkyl β-aminoacrylate represented by the formula:

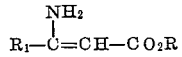

wherein R and $R_1$ have the values specified above. The 2-alkyl-5-hydroxy-3-carbalkoxyindoles are prepared by the reaction of quinone with an alkyl β-aminocrotonate, more specifically for example with ethyl β-aminocrotonate, to produce the desired 5-hydroxy-3-carbalkoxyindole. Other representative alkyl β-aminocrotonates which are employed in the method of the present invention include the following: propyl β-aminocrotonate, butyl β-aminocrotonate, amyl β-aminocrotonate, and the like. The method disclosed by Nenitzescu, [Bull Soc. Chim., Romania, 11, 37–43, (1929)], may be followed generally in the preparation of the 2-alkyl-5-hydroxy-3-carbalkoxyindoles. The 2-phenyl-5-hydroxy-3-carbalkoxyindoles, employed in the method of the present invention, are prepared by reacting quinone with an alkyl β-aminocinnamate, such as ethyl β-aminocinnamate, ethyl β-amino-para-methylcinnamate, propyl β-amino-para-chlorocinnamate, and the like. The alkyl β-aminocinnamates, utilized in the preparation of 5-hydroxy-3-carbalkoxyindoles, are prepared by the reaction of an alkyl benzoylacetate with ammonia.

In carrying out the method of the present invention, the 5-benzyloxy-3-carbalkoxyindoles are prepared by reacting a 5-hydroxy-3-carbalkoxyindole with a benzylating agent, e. g., a benzylhalide represented by the formula:

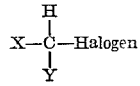

wherein X and Y have the values specified above. Representative benzyl halides include benzyl chloride, para-methylbenzyl bromide, para-methoxybenzyl iodide, benzhydryl chloride, para,para'-dibromobenzhydryl chloride, or the like. The benzylation is preferably conducted in the presence of a solvent such as water, ethanol, methanol, isopropanol, and the like, with ethanol being preferred, and a base such as the alkali-metal alkoxides, e. g., sodium ethoxide, potassium methoxide, and the like, or the alkali-metal carbonates, e. g., sodium carbonate, potassium carbonate, lithium carbonate, and the like, may be employed. In some instances calcium or sodium hydroxide may be utilized. The benzylation is preferably completed at the boiling point of the reaction mixture involved, preferably under nitrogen, although other temperatures between about fifty to 150 degrees centigrade made also be utilized. The reaction is usually complete after a period between about two and five hours, a shorter reaction time being required at the higher temperature, whereafter the reaction mixture is poured into the water to precipitate the desired 5-benzyloxy-3-carbalkoxyindole, and the 5-benzyloxy-3-carbalkoxyindole is recovered therefrom by filtration. The 5-benzyloxy-3-carbalkoxyindole may thereupon be further purified, if so desired, by boiling with dry ether, cooling, and washing the filtered solid with alkali. The solid 5-benzyloxy-3-carbalkoxyindole may also be recrystallized, if so desired, from the higher alcohols such as secondary butanol, tertiary butanol, amyl alcohol, and the like.

The following examples will serve to illustrate the process of this invention, but the said invention is not to be considered as limited thereto.

*Example 1.—2-methyl-5-benzyloxy-3-carbethoxyindole*

To 2.9 grams (0.126 mole) of sodium was added 175 milliliters of absolute ethanol and to the sodium ethoxide thus prepared was added 2.7 grams (0.123 mole) of 2-methyl-5-hydroxy-3-carbethoxyindole and 16.5 grams (0.13 mole) of benzyl chloride. The mixture was refluxed under nitrogen for two hours, poured into water, and the 2-methyl-5-benzyloxy-3-carbethoxyindole filtered therefrom. The 2-methyl-5-benzyloxy-3-carbethoxyindole was boiled with 500 milliliters of dry ether, cooled, filtered, and washed with sodium hydroxide. A yield of 9.5 grams was obtained and the product melted at 152–152.5 degrees centigrade.

*Analysis.*—Percent calculated for $C_{19}H_{19}NO_3$: C, 73.75; H, 6.19. Found: C, 73.78; H, 6.12.

In the same manner the following 5-benzyloxy-3-carbalkoxyindoles are prepared by reacting the chosen 5-hydroxy-3-carbalkoxyindole with the selected benzylating agent: 2-ethyl-5-benzyloxy-3-carbethoxyindole, 2-propyl-5-benzyloxy-3-carbopropoxyindole, 2-hexyl-5-benzyloxy-3-carbethoxyindole, 2-octyl-5-benzyloxy-3-carbethoxyindole, 2-ethyl-5-benzyloxy-3-carbomethoxyindole, 2-propyl-5-benzyloxy-3-carbobutoxyindole, and the like.

*Example 2.—2-methyl-5-benzhydryloxy-3-carbomethoxyindole*

In essentially the same manner as given in Example 1, 2-methyl-5-benzhydryloxy-3-carbomethoxyindole is prepared by benzylating 2-methyl-5-hydroxy-3-carbomethoxyindole, utilizing sodium ethoxide, with benzhydryl chloride.

In the same manner the following 5-benzyloxy-3-carbalkoxyindoles are prepared by reacting the chosen 5-hydroxy-3-carbalkoxyindole with the selected benzylating agent: 2-ethyl-5-benzhydryloxy-3-carbethoxyindole, 2 - propyl - 5 - benzhydryloxy - 3 - carbomethoxyindole, 2 - phenyl - 5 - benzhydryloxy - 3 - carbomethoxyindole, 2 - (paramethylphenyl)-5-benzhydryloxy-3-carbopropoxyindole, 2-(metachlorophenyl)-5-benzhydryloxy-3-carbethoxyindole, 2-(para-propoxyphenyl) - 5 - benzhydryloxy-3-carbomethoxyindole, and the like.

*Example 3.—2-(para-methylphenyl) - 5 - (para,para'-dimethylbenzhydryloxy)-3-carbethoxyindole*

In essentially the same manner as given in Example 1, 2-(para-methylphenyl) - 5 - (para,para'-dimethylbenzhydryloxy)-3-carbethoxyindole is prepared by benzylating 2-(para-methylphenyl)-5-hydroxy - 3 - carbethoxyindole, utilizing potassium carbonate, with para,para'-dimethylbenzhydryl chloride.

In the same manner the following 5-benzyloxy-3-carbalkoxyindoles are prepared by reacting the chosen 5-hydroxy-3-carbalkoxyindole with the selected benzylating agent: 2 - phenyl-5-(para-methylbenzyloxy)-3-carbopropoxyindole, 2-propyl-5-(para,para'-diethylbenzhydryloxy)-3-carbobutoxyindole, 2-(para-iodophenyl) - 5 - (para-propylbenzyloxy) - 3 - carbopropoxyindole, 2-(para-chlorophenyl)-5-(para,para' - dimethylbenzhydryloxy)-3-carbomethoxyindole, and the like.

*Example 4.—2 - Propyl-5-(para,para'-dimethoxybenzhydryloxy)-3-carbomethoxyindole*

In essentially the same manner as given in Example 1, 2 - propyl-5-(para,para'-dimethoxybenzhydryloxy)-3-carbomethoxyindole is prepared by benzylating 2-propyl-5-hydroxy-3-carbomethoxyindole, utilizing potassium methoxide, with para,para'-dimethoxybenzhydryl bromide.

In the same manner the following 5-benzyloxy-3-carbalkoxyindoles are prepared by reacting the chosen 5-hydroxy-3-carbalkoxyindole with the selected benzylating agent: 2-phenyl-5-(para-ethoxybenzyloxy)-3-carbethoxyindole, 2-ethyl - 5 - (para,para'-dimethoxybenzhydryloxy) - 3 - carbopropoxyindole, 2-(para-propylphenyl)-5-(para-ethoxybenzyloxy)-3-carbethoxyindole, and the like.

*Example 5.—2-propyl-5-(para,para'-dichlorobenzhydryloxy)-3-carbopropoxyindole*

In essentially the same manner as given in Example 1, 2 - propyl-5-(para,para'-dichlorobenzhydryloxy)-3-carbopropoxyindole is prepared by benzylating 2-propyl-5-hydroxy-3-carbopropoxyindole, utilizing sodium carbonate, with para,para'-dichlorobenzhydryl chloride.

In the same manner the following 5-benzyloxy-3-carbalkoxyindoles are prepared by reacting the chosen 5-hydroxy-3-carbalkoxyindole with the selected benzylating agent: 2 - phenyl-5-(para-bromobenzyloxy)-3-carbomethoxyindole, 2-methyl - 5 - (para,para'-dichlorobenzhydryloxy) - 3 - carboamyloxyindole, 2-(para-ethoxyphenyl)-5-(para-iodobenzyloxy)-3-carbethoxyindole, 2-(para-methoxyphenyl)-5-(para,para' - dichlorobenzhydryloxy-3-carbethoxyindole, and the like.

It is to be understood that this invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the class consisting of 5-benzyloxy-3-carboxyindole having the formula:

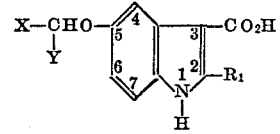

and the lower-alkyl esters and the alkali-metal salts thereof wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and $R_1$ is selected from the group consisting of lower alkyl, phenyl, halophenyl, lower alkoxyphenyl, and lower alkylphenyl.

2. A 5-benzyloxy-3-carbalkoxyindole having the formula:

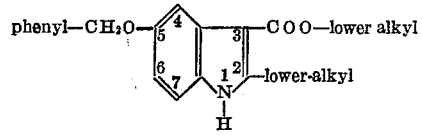

3. 2-methyl-5-benzyloxy-3-carbethoxyindole.

4. A 5-benzyloxy-3-carbalkoxyindole having the formula:

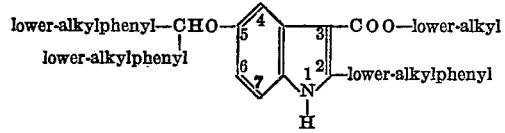

5. A 5-benzyloxy-3-carbalkoxyindole having the formula:

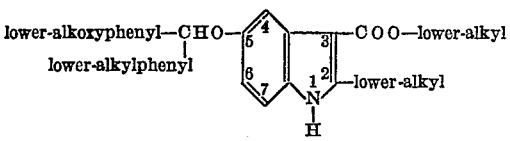

6. A 5-benzyloxy-3-carbalkoxyindole having the formula:

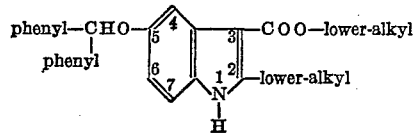

7. A 5-benzyloxy-3-carbalkoxyindole having the formula:
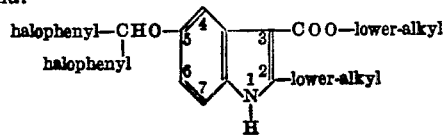
References Cited in the file of this patent
Beer, Jr., Chem. Soc. (London), 1948, pp. 1605–1609.
Bergel, Jr., Chem. Soc. (London), 1943, p. 49.